(12) United States Patent
Friesel et al.

(10) Patent No.: US 7,729,820 B1
(45) Date of Patent: Jun. 1, 2010

(54) SYSTEM AMD METHOD FOR MANEUVERING A MOBILE PLATFORM WITH AN ON-BOARD OBSTRUCTION

(75) Inventors: Mark A. Friesel, Ewing, NJ (US); John S. D'Arcy, Huntsville, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/369,843

(22) Filed: Feb. 12, 2009

(51) Int. Cl.
  *G05D 3/00* (2006.01)
(52) U.S. Cl. .......................................................... 701/21
(58) Field of Classification Search ................ 701/1–2, 701/21, 23
  See application file for complete search history.

(56) References Cited

U.S. PATENT DOCUMENTS

| 2004/0148063 A1* | 7/2004 | Patchell .......................... 701/1 |
| 2008/0119970 A1 | 5/2008 | Campbell et al. |

\* cited by examiner

*Primary Examiner*—Kim T Nguyen
(74) *Attorney, Agent, or Firm*—Duane Morris LLP

(57) ABSTRACT

A plurality of targets in a mobile platform's obstructed zone can be cleared from the obstructed zone and engaged in the most time-efficient manner by maneuvering the platform to clear and engage each target having the minimum clearance displacement in turn as measured from the platform's position following each maneuver.

14 Claims, 4 Drawing Sheets

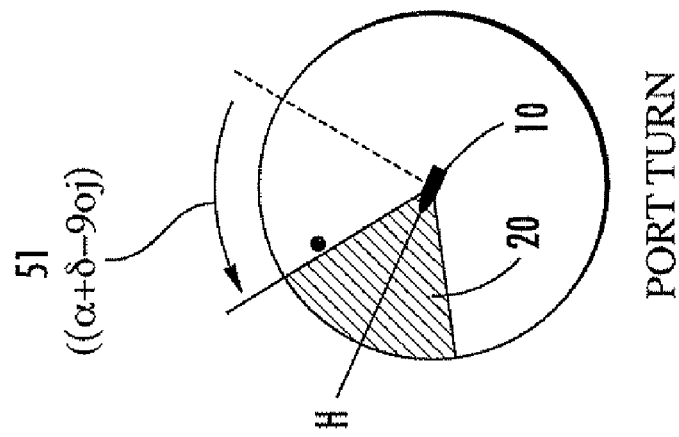
FIG. 2C PORT TURN
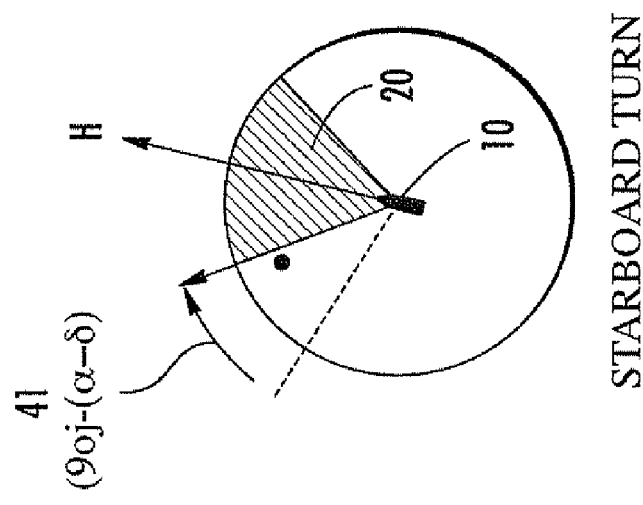
FIG. 2B STARBOARD TURN
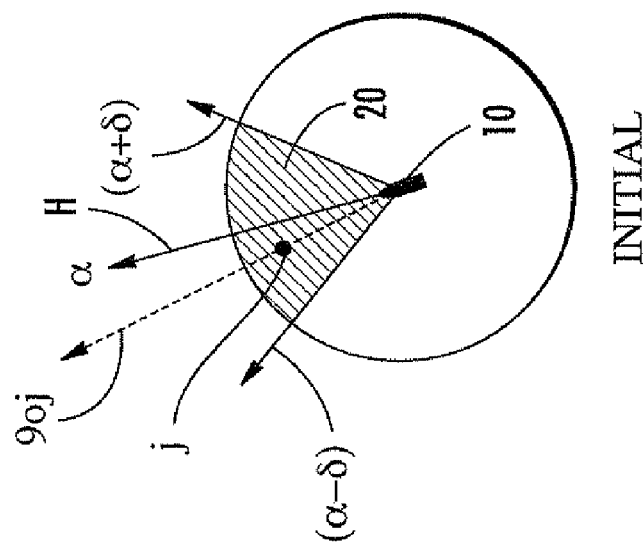
FIG. 2A INITIAL

SYSTEM AMD METHOD FOR MANEUVERING A MOBILE PLATFORM WITH AN ON-BOARD OBSTRUCTION

CROSS-REFERENCE TO RELATED APPLICATION

None

FIELD OF THE INVENTION

This disclosure generally relates to a method of guiding a maneuverable mobile platform such as a vehicle or ship for engaging and/or observing a plurality of targets.

BACKGROUND

Many armed military vehicles generally have some blind spots or obstructed zones and do not have the ability to engage hostile targets with the onboard weaponry with 360° coverage. For example, on many armed military ships, some on-deck structure such as the ship's superstructure impose obstructions to the on-board weaponry. The area around the ship that can not be reached by the on-board weaponry because of the on-deck obstructions is identified as the ship's obstructed zone. So such a ship does not have 360° clearance for its weaponry and the ship can not engage any hostile targets that are in the ship's obstructed zone. When hostile targets are in the ship's obstructed zone, the ship must maneuver to bring the targets out of the obstructed zone (i.e. clear the targets) in order to engage them. When multiple hostile targets are in the ship's obstructed zone, it would be desirable to know the most time efficient way of maneuvering the ship to clear and engage each of the multiple hostile targets.

SUMMARY

According to an implementation of the present disclosure, a method of maneuvering a mobile platform such as a vehicle or ship for clearing a plurality of targets that are in the platform's obstructed zone comprises (a) identifying a first target among the plurality of targets with a minimum time for the platform to clear, wherein a maneuvering direction and a maneuvering displacement required for clearing the first target are determined; (b) maneuvering the platform by turning the platform in the maneuvering direction by the maneuvering displacement, whereby the first target is cleared from the platform's obstructed zone; (c) engaging the first target whereby one fewer targets remain from the plurality of targets; (d) identifying a next target among the remaining targets with a minimum time for the platform to clear, wherein a maneuvering direction and a maneuvering displacement required for clearing the next target are determined; (e) maneuvering the platform by turning in the maneuvering direction by the maneuvering displacement, whereby the next target is cleared from the platform's obstructed zone; (f) engaging the next target whereby one fewer targets remain from the remaining targets; and (g) repeating the steps (d)–(f) until all of the plurality of targets are cleared and engaged.

According to another embodiment, a non-transitory machine-readable storage medium encoded with a computer program code is disclosed. When the computer program code is executed by a processor, the processor performs a method for maneuvering a mobile platform summarized above and described in detail below.

According to another embodiment, an on-board control system is provided on the mobile platform wherein the on-board system controller comprises the machine-readable storage medium mentioned above.

The advantage of the method disclosed herein is that it results in the minimum time to clear the targets.

BRIEF DESCRIPTION OF THE DRAWINGS

These and other features and advantages of the present invention will be more fully disclosed in the following detailed description of a preferred embodiment of the invention, which is to be considered together with the accompanying drawings wherein like numbers refer to like parts, and further wherein:

FIGS. 2a–2c are schematic illustrations of maneuvers the ship of FIG. 1 may make to clear a target in an obstructed zone.

Figure 1:
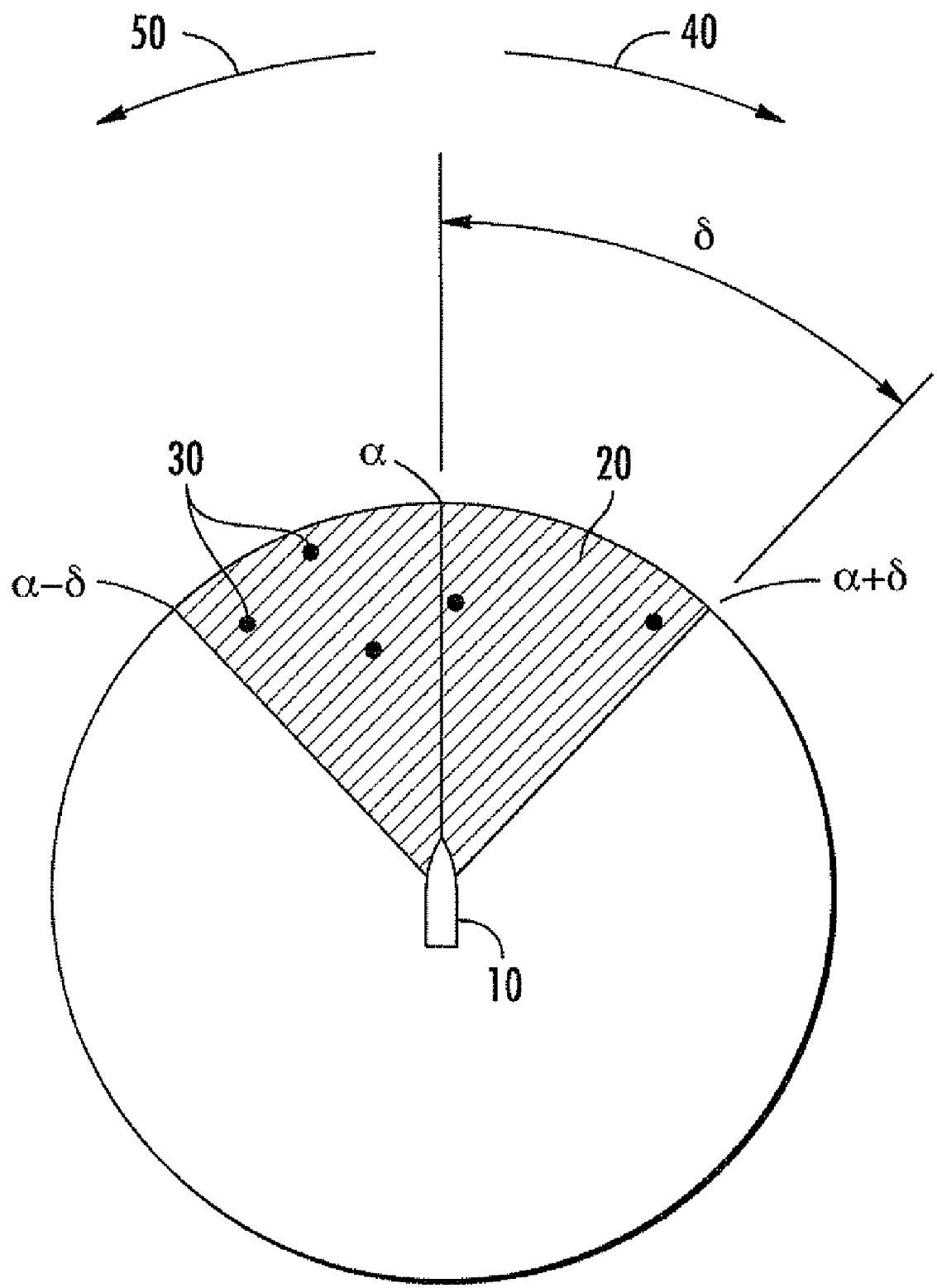
FIG. 1 is a schematic top-down view of a ship as an exemplary mobile platform and its obstructed zone of width 2δ in bearing populated with targets.

All drawings are schematic and are not intended to show any dimensions to scale.

DETAILED DESCRIPTION

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation.

The method of the present disclosure is applicable to any maneuverable mobile platform such as a vehicle or ship carrying a weapon or a sensor that has an obstructed zone. For illustrative purposes, however, the following detailed description will use a ship as an example. When applied to a more general maneuverable platform, the starboard and port maneuvering directions discussed in the ship example would correspond to clockwise and counterclockwise directions.

The problem addressed by the method of the present disclosure is to find the maneuver path required for a ship to clear a plurality of objects or hostile targets in the ship's obstructed zone in the minimum time. This allows the ship to clear and engage each of the plurality of hostile targets in the ship's obstructed zone in the shortest time. This is beneficial because that minimizes the chances of one or more of the plurality of hostile targets from taking a hostile action against the ship. The solution is applicable to any similar problem, i.e. interaction between a platform and each of N other objects when some of the interactions must be preceded by a maneuver.

The minimum-time maneuver required to clear any jth target incorporates the minimum time to clear the preceding target. Consequently, the method involves finding the target, among the remaining targets in the ship's obstructed zone, with the minimum time to clear following each maneuver. The ship's maneuver involves turning its heading either in starboard or port direction by some angle. Since turns are not instantaneous, a delay may be added to the maneuver time whenever a change in turn direction occurs. Additionally, some action may be required on each clear target, causing additional delay when a minimum-time maneuver would cause the target to re-enter the obstructed region. However, the algorithm can easily accommodate these and other potential enhancements such as incorporating velocities and non-rotational platform. For the method of the present disclosure, a constant turning rate $\dot{\phi}$ is assumed for the ship's maneuvers and the targets are assumed to be stationary.

It is shown that any minimum maneuver time for the jth maneuver incorporates the minimum maneuver time for the (j−1)th maneuver, and so a minimum total maneuver time estimate is obtained by summing minimum maneuver times for each maneuver. An unspecified minimization algorithm may be used to estimate the minimum time. The method of the present disclosure may also be used for clearing subsets, clusters, or distributions e.g. the centroids of normally distributed clusters of objects, and so on.

An example of a condition shown in FIG. 1 will be considered. FIG. 1 shows a schematic top-down view of a ship 10 having an obstructed zone 20 created by an on-board obstruction structure. The obstructed zone 20 has a width 2δ in bearing populated with targets 30. The bearing of the heading of the ship 10 is identified as α and the bearing of the edges of the obstructed zone 20 are (α−δ) and (α+δ). The ship 10 can turn at constant rate in either the starboard direction 40 or the port direction 50. The explanation of the method is aided by a numbering convention, and here targets will be numbered in ascending order in the clockwise direction. Consequently a turn to starboard sufficient to clear target n of N distributed targets, clears n targets. A turn to port clears (N−n+1) targets.

Referring to FIGS. 2a–2c, a set of nomenclature related to the ship's maneuvers and the relative bearings of the targets with respect to the ship's heading will be defined. FIG. 2a shows the initial position of the target j having a bearing $\vartheta_{0j}$ in the obstructed zone 20 of the ship 10. Initially, the ship's heading H is in bearing α and the bearings of the edges defining the obstructed zone 20 are (α−δ) and (α+δ) as shown in FIG. 2a. Then, the angular distance 41 to clear the target j by a starboard turn is $\vartheta_{0j}-(\alpha-\delta)$ as shown in FIG. 2b. The angular distance 51 to clear the target j by a port turn is $(\alpha+\delta)-\vartheta_{0j}$ as shown in FIG. 2c. Either maneuver yields a new target position bearing $\vartheta_{1j}$ relative to the ship's heading H.

The method of maneuvering a platform for clearing and engaging a plurality of targets that are in the platform's obstructed zone according to the present disclosure will be described using the example where the maneuverable platform is the ship 10 having the obstructed zone 20. First, a first target with a minimum time for the ship to clear is identified among the plurality of targets in the obstructed zone 20. For discussion, however, an example of two targets 1 and 2 in the obstructed zone 20 will be considered. In this identification step, a maneuvering direction and a maneuvering displacement for the ship 10 required for clearing the first target are determined.

Figure 3:
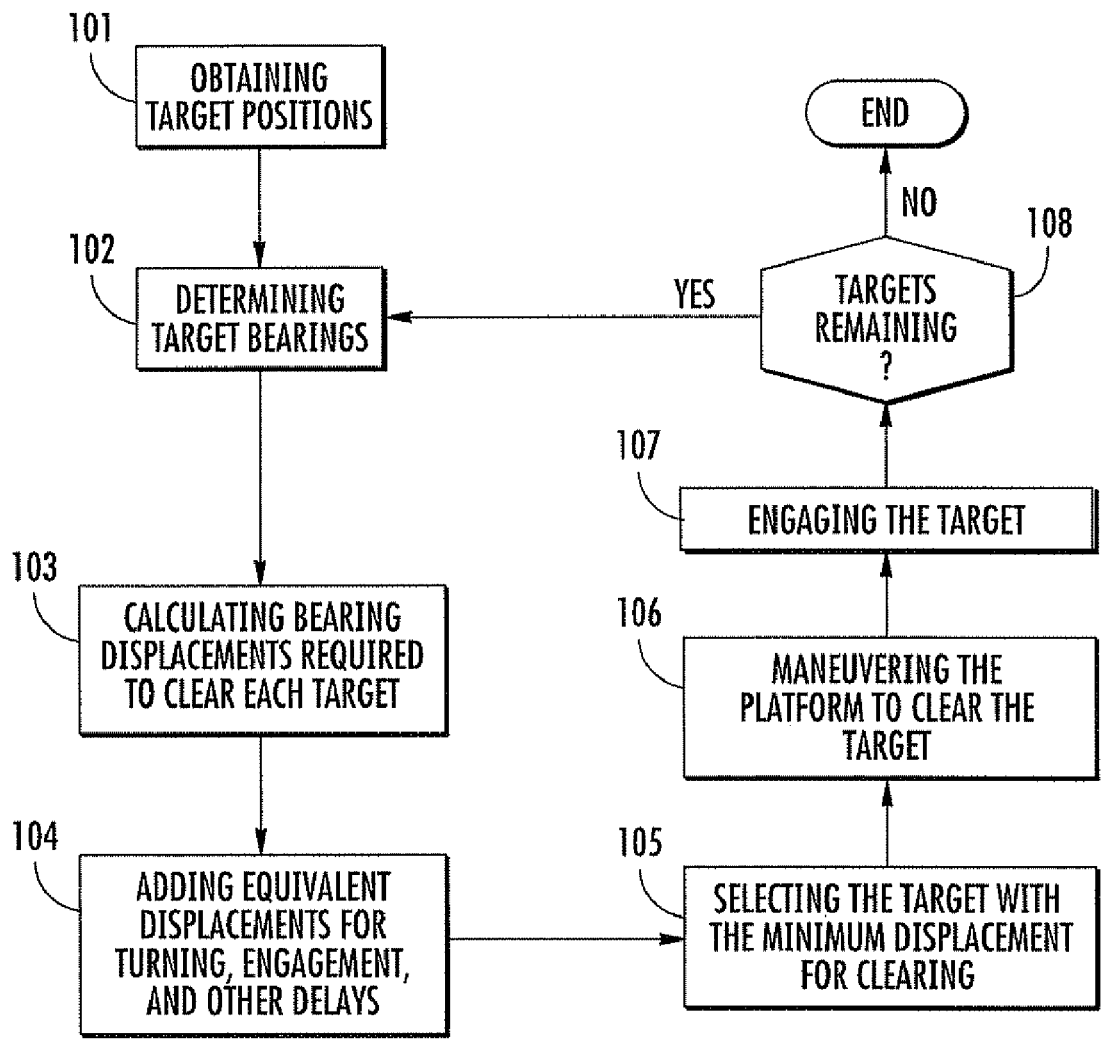
FIG. 3 is a flowchart illustrating the method of the present disclosure.

Referring to the flowchart 100 shown in FIG. 3, the positions of the targets 1 and 2 in the obstruction zone 20 are obtained and provided to the ship's on-board system controller. The targets' position data is obtained by an on-board radar system (not shown), for example. (See block 101). The ship's system controller also controls the ship's propulsion system_and maneuvers the ship 10. From the targets' position data, the system controller determines the targets' bearings. (See block 102). The targets 1 and 2 are initially at bearings $\vartheta_{01}$ and $\vartheta_{02}$ respectively. Next, the ships' system controller determines which of the two targets 1, 2 would take a shorter time (i.e. the minimum time) for the ship 10 to clear. (See block 105). Since the ship's turn rate $\dot{\phi}$ is assumed to be constant, the minimum time problem can be analyzed as a minimum distance problem (i.e. minimum displacement problem) and in order to select the target with the minimum displacement, the system controller first calculates bearing "displacement" required to clear each target. (See block 103). Given the two targets 1 and 2, the initial choices for the ship's possible maneuver are:

(First Option) $d_{01+}=\vartheta_{01}-(\alpha-\delta)\equiv$ starboard turn displacement required to clear target 1, (Second Option) $d_{01-}=(\alpha+\delta)-\vartheta_{01}\equiv$ port turn displacement required to clear target 1, (Third Option) $d_{02+}=\vartheta_{02}-(\alpha-\delta)\equiv$ starboard turn displacement required to clear target 2, and (Fourth Option) $d_{02-}=(\alpha+\delta)-\vartheta_{02}\equiv$ port turn displacement required to clear target 2.

The "+" and "−" for $d_{0j}$ refers to starboard and port turning directions, respectively. If the first option to clear target 1 were taken, i.e. a starboard turn of $d_{01+}=\vartheta_{01}-(\alpha-\delta)$, the target 2 would then be located at bearing $\vartheta_{12}=\vartheta_{02}-d_{01+}$. Then, the maneuvering options for the ship 10 to clear the target 2 are:

$$d_{12+}=\vartheta_{12}-(\alpha-\delta)=\vartheta_{02}-\vartheta_{01}=d_{02+}-d_{01+}, \text{ and}$$

$$d_{12-}=(\alpha-\delta)-\vartheta_{12}=(\alpha+\delta)-\vartheta_{02}+d_{01+}=2\delta-(\vartheta_{02}-\vartheta_{01})=d_{02-}+d_{01+}.$$

For each of the two maneuvering options for the second turn, the total displacements for the ship 10 are:

$D_1=d_{02+}$ for starboard turn of $d_{12+}$, and $D_2=d_{02-}+2d_{01+}$ for port turn of $d_{12-}$.

If the second option to clear target 1 were taken, i.e. a port turn of $d_{01-}=(\alpha+\delta)-\vartheta_{01}$, the target 2 would be located at bearing $\vartheta_{12}=\vartheta_{02}+d_{01-}$. Then, the maneuvering options for the ship 10 to clear target 2 are:

a starboard turn of $d_{12+}=\vartheta_{12}-(\alpha-\delta)=2\delta+(\vartheta_{02}-\vartheta_{01})=d_{02+}+d_{01-}$, and a port turn of $d_{12-}=(\alpha+\delta)-\vartheta_{12}=-(\vartheta_{02}-\vartheta_{01})=-d_{02+}+d_{01+}$.

Both options for the second turn results in the target 2 being outside the range [0, 2δ] which means that the target 2 is already clear after the first maneuver turn. The range defined here as [0, 2δ] means the range inclusive of the end points 0 and 2δ. For each of the two maneuvering options for the second turn, the total displacements for the ship 10 are:

$D_3=d_{01-}$, and $D_4=d_{01-}$.

If the third option, in which the target 2 is cleared first, were taken, i.e. a starboard turn of $d_{02+}=\vartheta_{02}-(\alpha-\delta)$, the target 1 would be located at bearing $\vartheta_{11}=\vartheta_{01}-d_{02+}$. Then, the maneuvering options for the ship 10 to clear target 1 are:

$$d_{11+}=\vartheta_{11}-(\alpha-\delta)=-(\vartheta_{02}-\vartheta_{01})=-d_{02+}+d_{01+}, \text{ and}$$

$$d_{11-}=(\alpha+\delta)-\vartheta_{11}=2\delta-(\vartheta_{02}-\vartheta_{01})=d_{02+}+d_{01-}.$$

Both options for the second turn results in the target 1 being outside the range [0, 2δ] which means that the target 1 is already clear after the first maneuver turn. For each of the two maneuvering options for the second turn, the total displacement for the ship 10 are:

$D_5=d_{02+}$, and $D_6=d_{02+}$.

Finally, if the fourth option, in which the target 2 is cleared first again, were taken, i.e. a port turn of $d_{02-}=(\alpha+\delta)-\vartheta_{02}$, the target 1 would be located at bearing $\vartheta_{11}=\vartheta_{01}+d_{02-}$. The, the maneuvering options for the ship 10 to clear target 1 are:

$$d_{11+}=\vartheta_{11}-(\alpha-\delta)=2\delta-(\vartheta_{02}-\vartheta_{01})=d_{02-}+d_{01+}, \text{ and}$$

$$d_{11-}=(\alpha-\delta)-\vartheta_{11}=\vartheta_{02}-\vartheta_{01}=d_{02+}-d_{01+}.$$

For each of the two maneuvering options for the second turn, the total displacement for the ship 10 are:

$$D_7=2d_{02-}+d_{01+}, \text{ and}$$

$$D_8=d_{01-}.$$

In the above example, any of the $d_{1j\pm}$ outside of the range $[0, 2\delta]$ means that the object is already clear and only the first clearance distance need be considered as indicated. In the case that $d_{01+}$ is the minimum first clearance displacement, it follows that $d_{01-}>(d_{02+}, d_{02-})>d_{01+}$. This eliminates $D_3$, $D_4$, $D_7$, and $D_8$, leaving four possible minimum displacement solutions, and each of these remaining solutions clears the minimum solution $d_{01+}$ first. The minimum total displacement of $D_1$, $D_2$, $D_5$, and $D_6$ now depends only upon whether $d_{12+}$ or $d_{12-}$ is the smaller displacement. The system controller maneuvers the ship 10 by selecting the target with the minimum displacement and executing the smaller displacement maneuver. (See blocks 105 and 106). Once the chosen target is cleared, the target is engaged by the ship 10. (See block 107). Next, if there are any targets remaining (see block 108), the process described above is repeated by determining the bearings of the remaining targets. In the flowchart 100, the system controller loops back to the block 102. If all targets in the obstructed zone 20 are cleared and engaged, the process terminates until the ship 10 encounters a next set of targets in the obstructed zone 20.

It follows that the minimum time solution to clear a N number of targets in the ship's obstructed zone 20 can be reached by clearing each target having the minimum clearance displacement in turn as measured from the ship's position following each maneuver. The solutions are seen to be symmetric, so the same conclusion is drawn if the target 2 was cleared by the first maneuver by finding the minimum clearance displacement.

The displacements above are expressed in magnitudes only. The displacements corresponding to a starboard turn are indicated by positive values and displacements corresponding to a port turn are indicated by negative values. Let the minimum signed displacement for the $j^{th}$ maneuver $s_j$ be given by $$s_j=sgn(min\{d_{jk\pm}\})min\{d_{jk\pm}\}, \quad (a)$$

where $sgn(x_\pm)$ represents the subscript-indicated signed unit associated with x rather than the usual signed unit of the variable x itself, and $min\{x_k\}$ is the minimum of all elements $x_0, x_1, \ldots, x_N$. In somewhat extended form there could be a set of signs $\{sgn_{jk\pm}\}$ with each entry $sgn_{jk\pm}$ carrying the sign of the corresponding $d_{jk\pm}$. With this notation the above equation (a) could be rewritten as $$s_j=sgn_{jk\pm}\cdot min\{d_{jk\pm}\}.$$

To obtain total (ideal, as discussed below) maneuver time, calculate $d_{(j+1)k\pm}=d_{jk\pm}-s_j$ for $j=(0, N)$ or until the targets are eliminated, removing any target from consideration if one of it's $d_{(j+1)k\pm}$ is not in the range $0<d_{1k\pm}<2\delta$. Then the total maneuver displacement to clear all targets is just $$S = \sum_j s_j$$

and the total maneuver time is $\dot{\phi}\cdot S$.

The above calculation does not account for the time delays attributed to the deceleration and acceleration needed to change the ship's heading (i.e. turning) nor for the time required for the ship to interact with the cleared targets (i.e. engage and destroy or disable, for example). However, these time delays can be easily expressed and incorporated into the calculation by the system controller and accounted for. (See block 104). For example, if the change in heading involves an invariant delay attributed to the ship's propulsion performance characteristics, define a corresponding "displacement" $\tau_0=delay/\dot{\phi}$. The parameter delay is determined from the ship's performance data. If in addition, $w_{(j-1)j}$ is defined by $w_{(j-1)k}=[\frac{1}{2}(sgn(d_{jk\pm})-sgn(s_{j-1}))]^2$ then $$s_j=sgn_{jk\pm}\cdot min\{(w_{(j-1)k}\tau_0+d_{jk\pm})\}.$$

The parameter w is similar to a delta function with value 1 if the next target requires a change in direction to clear, or 0 if the next target to clear is in the same direction as the current turning maneuver. The product $(w\times\tau_0)$ is the effective displacement cause by either coming to a halt and reversing direction, when the signs of d and s are opposite in the definition of w so that w=1, or when the next target location allows the turn to continue in the same direction, in which case w=0.

Also, if the neutralization "displacement" for a cleared target is a and the number of targets that were cleared by the previous maneuver is $n_{j-1}$ (i.e. half the difference in cardinality of $\{d_{jk\pm}\}$ and $\{d_{(j-1)k\pm}\}$) then $$S = \sum_j (n_{j-1}a + s_j).$$

The maneuver time estimate in these cases is still $T=S\dot{\phi}$. Greater fidelity to physical requirements can be added as needed. Such may include target activity, and subtraction of the time required to re-obstruct a cleared target from the neutralization delay time.

Thus, according to an implementation of the method described herein, the minimum clearance time for N targets in a ship's obstructed zone 20 under the given conditions and constraints is found as the sum of the minimum clearance times for each target calculated from the previous post-maneuver position of the ship.

Figure 4:
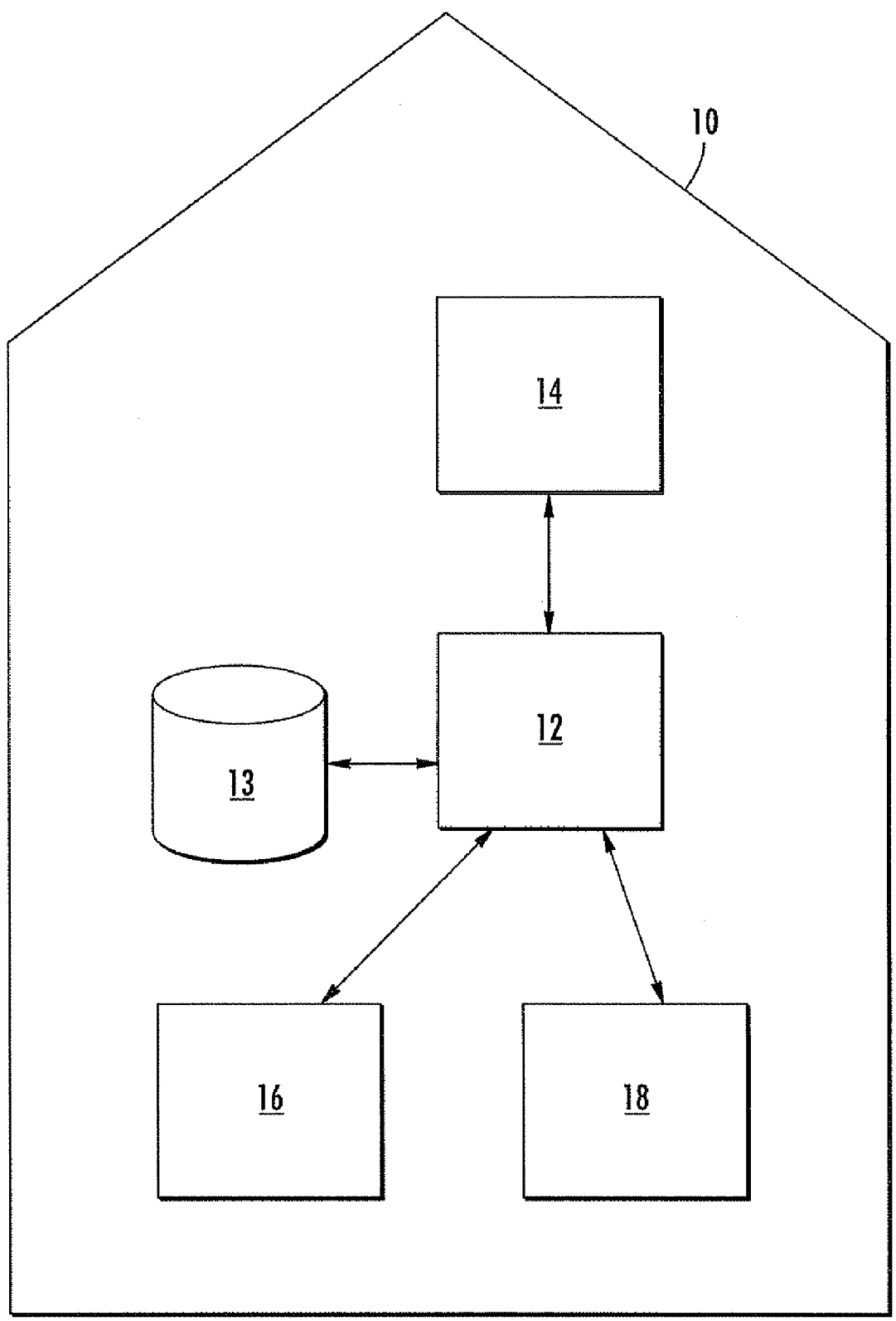
FIG. 4 is a schematic illustration of an example of the mobile platform of the present disclosure.

Referring to the schematic illustration of shown in FIG. 4, the mobile platform 10 discussed herein can comprise the on-board system controller 12, the on-board radar system 14, a propulsion system 16 (e.g. engine) appropriately configured to propel the mobile platform and a steering system 18 (e.g. rudders in the case of a ship) that is appropriately configured to maneuver the mobile platform. These sub-systems of the mobile platform 10 are configured and linked to each other enabling the on-board system controller 12 to control and coordinate the operations of the various sub-systems in executing the method disclosed herein.

The method and systems disclosed herein encompasses a machine-readable storage medium 13 encoded with computer program code, such that, when the computer program code is executed by a processor, such as the on-board radar system 14, the processor performs the method for maneuvering the mobile platform 10 described herein. Such machine-readable storage medium 13 can be a single data storage unit or storage system comprising multiple data storage units that are connected to the on-board system controller 12 and may include magnetic, optical or solid-state storage media, or a combination thereof, for example. The machine-readable storage medium 13 can also include portable machine-readable storage devices such as a random access memory device, a read only memory device, a magnetic medium such as a hard-drive or a floppy disk, or an optical medium such as a Compact Disc, a DVD, etc. that are loaded on to the on-board system controller 12 to allow the on-board system controller 12 to access the computer program code encoded thereon.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of maneuvering a mobile platform for clearing and engaging a plurality of targets that are in the platform's obstructed zone, said method comprising:
   (a) identifying a first target among the plurality of targets with a minimum time for the platform to clear, wherein a maneuvering direction and a maneuvering displacement required for clearing the first target are determined;
   (b) maneuvering the platform by turning the platform in said maneuvering direction by said maneuvering displacement, whereby the first target is cleared from the platform's obstructed zone;
   (c) engaging the first target whereby one fewer targets remain from the plurality of targets;
   (d) identifying a next target among the remaining targets with a minimum time for the platform to clear, wherein a maneuvering direction and a maneuvering displacement required for clearing the next target are determined;
   (e) maneuvering the platform by turning the platform in said maneuvering direction by said maneuvering displacement, whereby the next target is cleared from the platform's obstructed zone;
   (f) engaging the next target whereby one fewer targets remain from the remaining targets; and
   (g) repeating the steps (d)–(f) until all of the plurality of targets are cleared and engaged, wherein the platform's turning rate during the maneuvers is constant.

2. The method of claim 1, wherein the maneuvering direction is clockwise or counter-clockwise.

3. The method of claim 1, wherein the platform is a ship and the maneuvering direction is starboard or port.

4. The method of claim 1, wherein the step (a) further comprises:
   obtaining positions of the plurality of targets;
   determining bearings of the plurality of targets;
   calculating bearing displacements required to clear each target; and
   selecting a target with a minimum displacement that corresponds to the minimum time for the platform to clear.

5. The method of claim 4, wherein the maneuvering direction is clockwise or counter-clockwise.

6. The method of claim 4, wherein the platform is a ship and the maneuvering direction is starboard or port.

7. A non-transitory machine-readable storage medium encoded with computer program code, such that, when the computer program code is executed by a processor, the processor performs a method for maneuvering a mobile platform for clearing and engaging a plurality of targets that are in the platform's obstructed zone, said method comprising:
   (a) identifying a first target among the plurality of targets with a minimum time for the platform to clear, wherein a maneuvering direction and a maneuvering displacement required for clearing the first target are determined;
   (b) maneuvering the platform by turning the platform in said maneuvering direction by said maneuvering displacement, whereby the first target is cleared from the platform's obstructed zone;
   (c) engaging the first target whereby one fewer targets remain from the plurality of targets;
   (d) identifying a next target among the remaining targets with a minimum time for the platform to clear, wherein a maneuvering direction and a maneuvering displacement required for clearing the next target are determined;
   (e) maneuvering the platform by turning the platform in said maneuvering direction by said maneuvering displacement, whereby the next target is cleared from the platform's obstructed zone;
   (f) engaging the next target whereby one fewer targets remain from the remaining targets; and
   (g) repeating the steps (d)–(f) until all of the plurality of targets are cleared and engaged, wherein the platform's turning rate during the maneuvers is constant.

8. The non-transitory machine-readable storage medium of claim 7, wherein the maneuvering direction is clockwise or counter-clockwise.

9. The non-transitory machine-readable storage medium of claim 7, wherein the platform is a ship and the maneuvering direction is starboard or port.

10. The non-transitory machine-readable storage medium of claim 7, wherein the step (a) further comprises:
    obtaining positions of the plurality of targets;
    determining bearings of the plurality of targets;
    calculating bearing displacements required to clear each target; and
    selecting a target with a minimum displacement that corresponds to the minimum time for the platform to clear.

11. An on-board control system provided on a mobile platform for clearing and engaging a plurality of targets that are in the platform's obstructed zone, wherein the on-board control system comprising:
    a processor;
    a non-transitory machine-readable storage medium encoded with computer program code, such that, when the computer program code is executed by the processor, the processor performs a method for maneuvering the mobile platform for clearing and engaging the plurality of targets that are in the platform's obstructed zone, said method comprising:
    (a) identifying a first target among the plurality of targets with a minimum time for the platform to clear, wherein a maneuvering direction and a maneuvering displacement required for clearing the first target are determined;
    (b) maneuvering the platform by turning the platform in said maneuvering direction by said maneuvering displacement, whereby the first target is cleared from the platform's obstructed zone;
    (c) engaging the first target whereby one fewer targets remain from the plurality of targets;

(d) identifying a next target among the remaining targets with a minimum time for the platform to clear, wherein a maneuvering direction and a maneuvering displacement required for clearing the next target are determined;

(e) maneuvering the platform by turning the platform in said maneuvering direction by said maneuvering displacement, whereby the next target is cleared from the platform's obstructed zone;

(f) engaging the next target whereby one fewer targets remain from the remaining targets; and (g) repeating the steps (d)–(f) until all of the plurality of targets are cleared and engaged, wherein the platform's turning rate during the maneuvers is constant.

12. The on-board control system of claim 11, wherein the maneuvering direction is clockwise or counter-clockwise.

13. The on-board control system of claim 11, wherein the platform is a ship and the maneuvering direction is starboard or port.

14. The on-board control system of claim 11, wherein the step (a) further comprises:
   obtaining positions of the plurality of targets;
   determining bearings of the plurality of targets;
   calculating bearing displacements required to clear each target; and
   selecting a target with a minimum displacement that corresponds to the minimum time for the platform to clear.

* * * * *